June 24, 1952 B. M. OLIVER 2,601,415

VERTICAL SWEEP SYNCHRONIZING CIRCUIT

Filed June 30, 1949 2 SHEETS--SHEET 1

INVENTOR
B. M. OLIVER
BY Hugh S. Wertz
ATTORNEY

June 24, 1952 B. M. OLIVER 2,601,415

VERTICAL SWEEP SYNCHRONIZING CIRCUIT

Filed June 30, 1949 2 SHEETS—SHEET 2

INVENTOR
B. M. OLIVER
BY Hugh S. Wertz
ATTORNEY

Patented June 24, 1952

2,601,415

UNITED STATES PATENT OFFICE 2,601,415

VERTICAL SWEEP SYNCHRONIZING CIRCUIT

Bernard M. Oliver, Morristown, N. J., assignor to Bell Telephone Laboratories, Incorporated, New York, N. Y., a corporation of New York Application June 30, 1949, Serial No. 102,298

3 Claims. (Cl. 178—7.3)

This invention relates to television and more specifically to the synchronization of the horizontal and vertical sweep circuits in television receivers.

An object of this invention is to produce more accurate vertical synchronizing in television receivers.

Another object of this invention is to produce more accurate interlacing of the vertical sweep circuits in television receivers.

Still another object of this invention is to minimize the effect of noise, generally present in television receivers, on the vertical synchronization.

Noise in a received television signal disturbs the received synchronizing pulses and makes it impossible to detect with certainty the exact position of these pulses. If, for example, the sweep circuits are arranged to trip when the leading edge of the synchronizing pulse reaches a certain height, then, because the leading edge does not have and infinite slope, the added noise causes the circuit to trip too early or too late in a random dispersion about the correct time. Horizontal sweep circuits, known as AFC (automatic frequency control) or "fly-wheel" or "Synchrolok" circuits, have been devised which greatly reduce the susceptibility of the horizontal sweep to noise by making use of the fact that the individual horizontal pulses are disturbed at random and, therefore, a running average of the disturbances over several synchronizing pulses is disturbed much less than the probable disturbance of any one pulse.

In these "fly-wheel" or "Synchrolok" circuits, a local oscillator is used to develop the synchronizing pulses actually used by the receiver horizontal sweep circuit. The phase of the oscillation produced by this local oscillator is compared with the received synchronizing pulses. Any discrepancy or departure from the desired phase relationship produces a pulse out of the phase detector for each synchronizing pulse. This train of pulses has one sign if the phase is leading and the opposite sign if the phase lags. Noise in the synchronizing pulses causes random errors in the height of these pulses, so that no one pulse is a true measure of the phase error of the local oscillator. However, the average value of the train of pulses, taken over a large number of these pulses, is a very good measure of the average error for that period. This average value is obtained by a low-pass filter and the output of this filter is used to control the frequency of the local oscillator by means of a reactance tube. If the oscillator is too far advanced in phase, the output of the phase detector acting through the low-pass filter causes the voltage applied to the reactance tube to change, and lowers the oscillator frequency until the phase is correct.

In furtherance of the above objects and in accordance with the invention, a television receiver synchronizing circuit is provided in which the AFC ("Synchrolok") circuit controlling the horizontal sweep circuit is also used to control the vertical sweep circuit. Pulses at twice line scanning frequency are derived from the local stabilized oscillator in the AFC circuit and one of these pulses is selected by the vertical synchronizing pulse and used to trip the vertical sweep circuit.

The invention will be more readily understood by referring to the following description taken in connection with the accompanying drawings forming a part thereof, in which.

Figure 1:
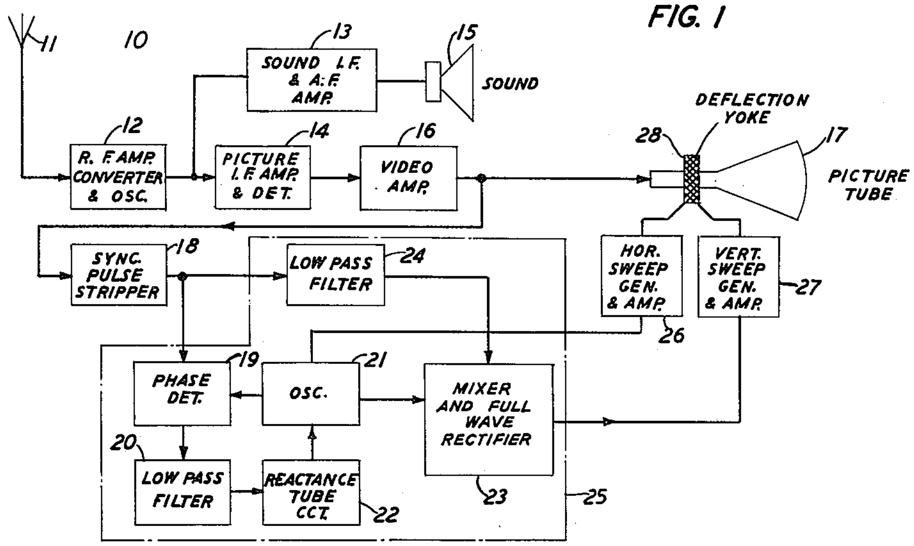
Fig. 1 is a block diagram of a television receiver system employing synchronizing circuits in accordance with the invention.

Referring more specifically to the drawings, Fig. 1 shows by way of example for purposes of illustration and in block diagram form, a typical television receiver 10 which has been modified to embody a synchronizing circuit in accordance with the invention. The incoming television signal is received by the antenna 11 and applied to the apparatus 12 where it is amplified and converted to an intermediate frequency. The radio frequency amplifier, the converter and the oscillator making up the apparatus 12 are of any well-known form and need not be described in detail here. The sound and picture modulated carriers are then separated and applied to the corresponding sound and picture intermediate frequency amplifiers 13 and 14, respectively, and there detected and amplified. The sound is reproduced by the loudspeaker 15 while the picture (video) signal is applied to the video amplifier 16 and the output thereof is used to modulate the picture tube 17. The video signal occurring in the output of the video amplifier 16 is also applied to the synchronizing pulse stripper 18, of well-known form. The function of the apparatus 18 is to remove all the picture information from the video signal, thereby leaving only the synchronizing signal. These synchronizing signals are separated into two parts to control the two-dimensional picture appearing on the screen of the picture tube 17. For vertical synchronization, the signal is normally integrated and the circuits are adjusted in such a way that the vertical sweep is started when this signal exceeds a specified level. For horizontal synchronization there are several different arrangements used commercially. One of these is the so-called "Synchrolok" or "fly-wheel" synchronizing circuit and this circuit is utilized in the present invention. An exceptionally high degree of stability for the vertical synchronizing pulse with negligible loss in time is produced by utilizing energy from the already stabilized horizontal synchronizing circuit to control the vertical sweep circuit.

The output of the synchronizing pulse stripper 18 is applied to the apparatus represented in the dash-dot box 25 in Fig. 1 (which apparatus is that shown in Fig. 2 and will be described more fully below) and from this apparatus horizontal and vertical synchronizing pulses are produced and applied to the horizontal and vertical sweep generators and amplifiers 26 and 27, respectively (which are of well-known form). In the members 26 and 27, appropriate sweep waves are generated and these waves are applied to the horizontal and vertical deflection coils on the yoke 28 around the neck of the picture tube 17 to control the deflection of the beam produced therein in well-known manner.

Figure 2:
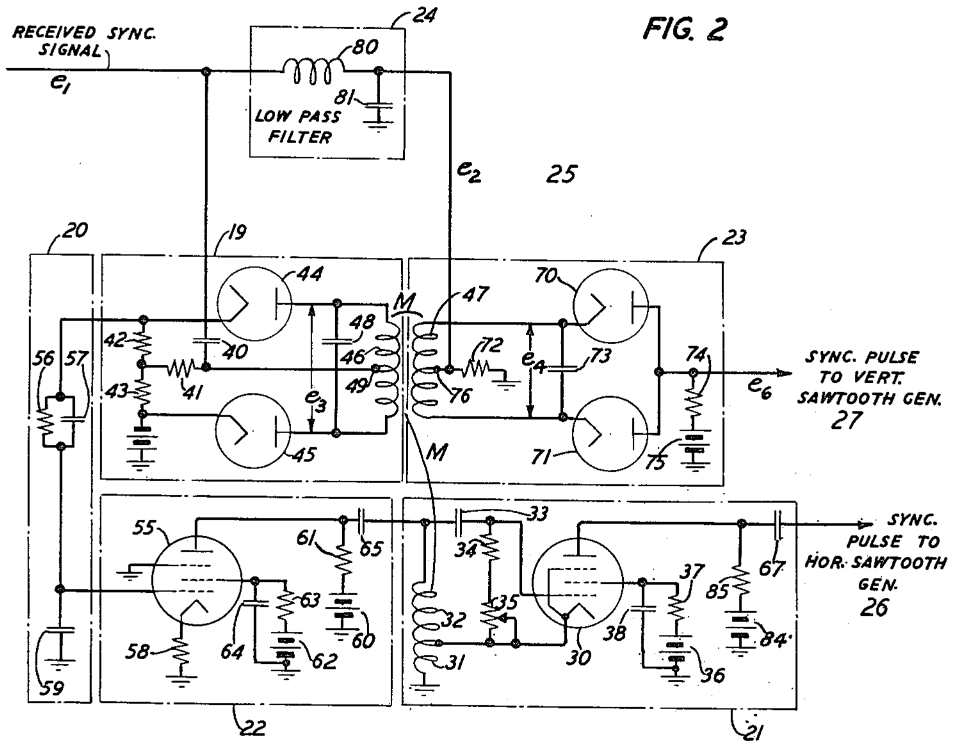
Fig. 2 is a circuit diagram of synchronizing circuits in accordance with the invention.

Reference will now be made to Fig. 2 for a detailed description of the apparatus shown in the large dash-dot box 25 in Fig. 1, which comprises a phase detector 19, a low-pass filter 20, a local oscillator 21, a reactance tube circuit 22, a modulator, full-wave rectifier and clipper 23 and a low-pass filter 24. The local oscillator 21 is used to develop the synchronizing pulses actually used by the horizontal sweep circuits in the receiver. The phase of the oscillation produced by this local oscillator is compared with the received synchronizing pulses. Any discrepancy or departure from the desired phase relationship produces a pulse from the phase detector 19 for each synchronizing pulse. The train of pulses has one polarity if the phase is leading and the opposite polarity if the phase lags. Noise in the synchronizing pulses causes random errors in the height of these pulses so that no one pulse is a true measure of the phase error of the local oscillator. However, the average value of the train of pulses, taken over a large number of pulses, is a good measure of the average error for that period. This average value is obtained by the low-pass filter 20 and the output of this filter is used to control the frequency of the local oscillator 21 by means of the reactance tube circuit 22. If the oscillation is too far advanced in phase, the output of the phase detector 19 acting through the low-pass filter 20 causes the voltage applied to the reactance tube to change. This lowers the oscillator frequency until the phase is correct. If the oscillation lags, the opposite effect is product. Before explaining the manner in which the vertical synchronizing pulses are derived, a detailed operation of the so-called "Synchrolok" circuit will first be given. The oscillator 21, which is a Hartley oscillator, comprises a tube 30 having a coil 31 in its cathode-anode circuit and a coil 32 in its grid-cathode circuit. Connected across the coil 32 is the tuning condenser 33 and resistors 34 and 35, the latter of which can be made adjustable. Also connected across the serially connected coils 32 and 31 is the circuit of the reactance tube 22, which will be described later. Plate voltage for the tube 30 is obtained by means of any suitable source 34 through anode resistor 35, while screen voltage is obtained by means of the source 36 acting through resistor 37. The screen is by-passed to ground through condenser 38. The circuits of the tube 30 are tuned to produce pulses of the correct frequency for horizontal synchronizing and this synchronization is maintained by the circuit now to be described.

The received synchronizing signal shown in the drawing (Fig. 3*a*) and represented by the character $e_1$ is applied through coupling condenser 40, common resistor 41 and equal resistors 42 and 43 to the cathodes of the two phase detector tubes 44 and 45, the anodes of which are connected together through coil 46, which is closely coupled to coil 47 and to coils 32 and 31. A tuning condenser 48 is connected across the coil 46. The voltage across this coil is represented in the drawing (Fig. 3*c*) by the reference character $e_3$. The sine wave voltages from the oscillator 21, applied to the plates of the tubes 44 and 45 by means of the coupling between the coils 32 and 31 and 46, are equal in amplitude and opposite in polarity. Synchronizing pulses $e_1$ derived from the incoming signal by means of the pulse stripper 18 are applied to the condenser 40 and resistance 41 which differentiate the signal applied to the center tap 49 of the winding 46. Horizontal synchronizing pulses thus appear (in the same polarity and of equal amplitude) on the anodes of both of the diodes 44 and 45. If the time of arrival of each synchronizing pulse coincides with the passing of the sine wave through its zero axis, both diodes conduct equal current through their equal load resistors 42, 43. The potentials appearing across the individual resistors 42, 43 are opposite in polarity and, therefore, their sum is normally zero, but if the phase of a synchronizing pulse changes with respect to that of the sine wave from the oscillator 21, one diode 44 or 45 will conduct more current than the other. The voltage attained cross the two resistors 42 and 43 will not then add to zero, being of negative polarity if one-half conducts more heavily or of positive polarity if the other half is more conductive. The output voltage of this phase detector circuit can swing from negative through zero to positive (and vice versa) depending on the phase relationship of the incoming synchronizing signal ($e_1$) and the sine wave output of the local oscillator 21. The output voltage of the phase detector is applied to the control grid of the tube 55 in the reactance tube circuit 22 through an RC circuit including resistor 56 and condensers 57 and 59. This RC network makes up the low-pass filter 20 and it is designed to attenuate rapid changes in the direct current potential from the phase detector circuit 19, such as are produced by vertical synchronizing pulses or bursts of noise.

The reactance tube 55 with its associated circuit is a variable reactance connected across the coils 32 and 31 of the oscillator tube 30. A change of grid potential of the tube 55 produces a change of the conductance of this tube which changes the frequency of the oscillator. If the phase of the oscillator output shifts with respect to that of the synchronizing pulse ($e_1$), the corresponding change in direct current from the phase detector 19 acts to bring the oscillator 21 back into phase. Tube 55 has a cathode resistor 58 and this provides some local feedback. Plate power is provided from the source 60 through a resistor 61 while screen voltage is provided from the source 62 through resistor 63. A by-pass condenser 64 is connected between the screen grid and ground. The output circuit of the tube 55 is connected across the coils 32, 31 of the oscillator 21 by means of the coupling condenser 65. The output of the oscillator 21 is applied to the horizontal sweep generator and amplifier 26 by means of the coupling condenser 67.

Figure 3:
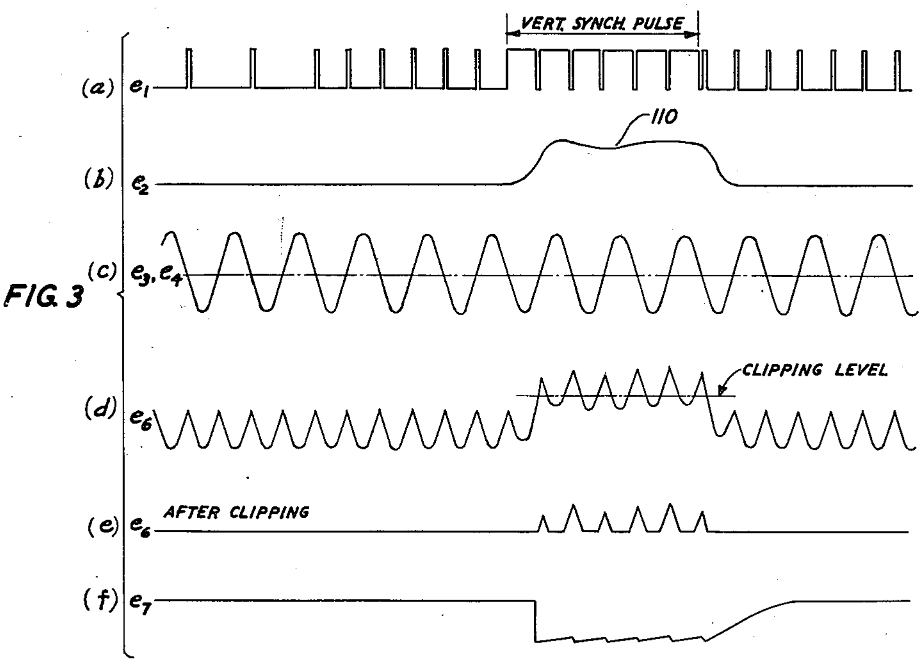
Fig. 3 shows the shapes of the voltage waves at various parts of the circuit of Fig. 2.

The coil 46 is coupled to the coil 47 which is connected between the cathodes of the balanced diodes 70 and 71 the anodes of which are connected together and to the vertical sweep generator and amplifier 27. The tubes 70 and 71 and their associated circuits form the mixer and full rectifier represented by the box 23 in Fig. 1. In addition to the sine waves of horizontal or line scanning frequency applied, in push-pull manner, to the cathodes of the tubes 70 and 71 by means of the coil 47, another input voltage $e_2$ is applied to the two cathodes in the same phase. This voltage $e_2$, shown in Fig. 3*b*, is obtained from the synchronizing signal $e_1$ after it has been passed through the low-pass filter 24 comprising the series coil 80 and the shunt condenser 81. This low-pass filter attenuates all frequencies of line frequency or higher. The output of this filter, voltage wave $e_2$, does not contain the horizontal synchronizing pulses nor the equalizing pulses except perhaps as a negligible ripple, and consists simply of a smooth long pulse with sloping sides caused by the vertical synchronizing pulse. All noise above the line frequency contained in the synchronizing pulses ($e_1$) is greatly attenuated so that very little noise power is present in the output ($e_2$). This output voltage is applied to the mid-terminal 76 of the coil 47 (which is magnetically coupled, as mentioned above, to the oscillator coils 32 and 31 in the "Synchrolok" circuit). This mid-terminal is also connected through the resistor 72 to ground. The cathodes of the two tubes are connected together through the condenser 73. The two diodes 70 and 71 and their associated circuit elements act as a full wave rectifier of the line frequency voltage appearing across the coil 47. For example, the plates of the diodes 70 and 71 are held, by conduction of the current through one or the other, to the potential of whichever of the cathodes is the more negative. Since the plates of the tubes 70 and 71 are connected through a resistor 74 to the positive terminal of source 75 the negative terminal of which is connected to ground, the current produced by source 75 flows through the resistance 74, through one or the other of the diodes 70 and 71 to the corresponding half of the coil 47 and through the resistance 72 to ground. The output voltage ($e_6$) shown in Fig. 3*d* as applied to the vertical sweep generator 27 is thus the sum of the voltage $e_2$ (the filtered vertical synchronizing pulse) and a series of negative half sine waves generated by the diodes 70 and 71 plus the voltage $e_4$. The voltage $e_6$ accordingly contains a series of positive peaks or cusps occurring at twice the line frequency. By choosing the capacitance 73 to have the proper value, the voltage ($e_4$) can be so phased that one of these positive cusps in $e_6$ occurs just before the leading edge of the pulse 110 in the voltage ($e_2$) shown in Fig. 3*b*, while the next one occurs just after this edge. This latter cusp and a few following are thus more positive than their neighbors, since the pulse 110 in ($e_2$) acts as a pedestal. The voltage threshold used to trip the vertical sweep circuit is adjusted so that the first cusp on the pedestal trips this circuit. The timing of the vertical sweep is thus controlled by a pulse which is itself accurately timed to within a small fraction of the time of one line while the vertical synchronizing pulse simply selects the proper one of the sharp pulses. The output pulse wave after clipping in an amplifier which may form part of the vertical sweep generator 27 is shown in Fig. 3*e*.

Refinements and modifications depend on the associated circuits and the quality of operation desired. For example, the wave $e_4$ (Fig. 3*c*) can be clipped to a square wave, differentiated and then full-wave rectified to form a series of sharp pulses rather than the half sine waves shown. An intermediate amplifier-limiter can be added to develop the wave ($e_7$) (Fig. 3*f*) from the pulses in ($e_6$) which exceed the cut-off bias of the amplifier. This would be desirable if a longer pulse, such as that shown by ($e_7$), is required to trip the vertical sweep circuit.

Various other changes can be made in the embodiments described above without departing from the spirit of the invention, as will be obvious to all those skilled in the art.

What is claimed is:

1. In a television receiver, means for receiving television signals containing horizontal and vertical synchronizing pulses, means for removing said horizontal synchronizing pulses from said signals to produce a residual signal, a local oscillator, a vertical sweep circuit, means responsive to the horizontal synchronizing pulses for stabilizing the frequency of said local oscillator, means responsive to oscillations from said local oscillator for deriving sharp pulses having a frequency of recurrence which is twice line scanning frequency, and means for mixing said residual signal and said sharp pulses for actuating said vertical sweep circuit.

2. In a television receiver, a vertical sweep circuit, means for receiving television signals containing vertical and horizontal synchronizing pulses, a local oscillator, means for stabilizing the frequency of said local oscillator by means of said horizontal synchronizing pulses, means for deriving from said local oscillator pulses at twice line scanning frequency, and means for selecting one of said pulses at twice line scanning frequency by a vertical synchronizing pulse to actuate the vertical sweep circuit.

3. In a television receiver, a vertical sweep circuit, means for receiving television signals containing vertical and horizontal synchronizing pulses, a local oscillator, means for stabilizing the frequency of said local oscillator by means of said horizontal synchronizing pulses, means for deriving from said local oscillator pulses at twice line scanning frequency, and means for selecting one of said pulses at twice line scanning frequency by a vertical synchronizing pulse to actuate the vertical sweep circuit, said means for producing pulses at twice line scanning frequency comprising a full-wave rectifier for rectifying the output waves from said local oscillator.

BERNARD M. OLIVER.

REFERENCES CITED

The following references are of record in the file of this patent:

UNITED STATES PATENTS

| Number | Name | Date |
|---|---|---|
| 2,245,409 | Miller | June 10, 1941 |
| 2,332,681 | Wendt | Oct. 26, 1943 |
| 2,358,545 | Wendt | Sept. 19, 1944 |
| 2,459,699 | Hallmark | Jan. 18, 1949 |